United States Patent [19]

Crooker

[11] Patent Number: 4,636,529

[45] Date of Patent: Jan. 13, 1987

[54] POLYURETHANE FOAMS FROM ISOCYANATE, POLYESTER POLYOL AND CHLORODIFLUOROMETHANE

[75] Inventor: Richard M. Crooker, Fogelsville, Pa.

[73] Assignee: Pennwalt Corporation, Philadelphia, Pa.

[21] Appl. No.: 733,024

[22] Filed: May 13, 1985

[51] Int. Cl.[4] ............................................. C08G 18/14
[52] U.S. Cl. ..................................... 521/131; 521/917
[58] Field of Search ................................. 521/131, 917

[56] References Cited

U.S. PATENT DOCUMENTS

| | | | |
|---|---|---|---|
| 4,070,310 | 1/1978 | Schneider et al. | 521/131 |
| 4,219,624 | 8/1980 | Fuzesi | 521/131 |
| 4,430,446 | 2/1984 | Lynn | 521/917 |
| 4,452,924 | 6/1984 | Radovich | 521/131 |
| 4,546,122 | 10/1985 | Radovich et al. | 521/131 |

Primary Examiner—Maurice J. Welsh

[57] ABSTRACT

Process for manufacture of polyurethane and poly(urethane/isocyanate) foams utilizing higher levels of aromatic polyester polyols in the polyol component through the substitution of $CHClF_2$ for at least a portion of the conventional blowing agents to provide a foamed product of lower combustibility and lower brittleness.

15 Claims, No Drawings

POLYURETHANE FOAMS FROM ISOCYANATE, POLYESTER POLYOL AND CHLORODIFLUOROMETHANE

BACKGROUND OF THE INVENTION

This invention relates to foamed plastics material and, more particularly, to a process for the manufacture of polyurethane (including polyisocyanurate) foams as well as to the foams themselves.

It is well known to manufacture such polyurethane foams by reacting an organic polyisocyanate (including diisocyanate) with slightly less than a stoichiometric amount of an organic polyol in the presence of a volatile liquid blowing agent which is caused to vaporize under the influence of the heat generated by the reaction between the polyisocyanate and the polyol. The vaporization of the blowing agent causes cells to grow in the liquid reaction mixture. As the reaction proceeds, the viscosity of the liquid increases, finally forming a solid polyurethane foam.

It is also generally known to use blowing agents which are gaseous at atmospheric conditions but which are held in a condensed form by maintaining the reaction mixture under pressure. In such case, vaporization of the blowing agent occurs when the pressure is released, with the reaction mixture then expanding to form a foam which subsequently cures to become the polyurethane foam.

It is also known to combine the above two types of blowing agent to provide part of the expansion before the exotherm develops. In this way, a foam may be formed and added to an enclosed cavity with less subsequent expansion and pressure build up from the reaction exotherm expansion than a foam blown exclusively due to the reaction exotherm.

Polyisocyanurate foams are similarly prepared except a larger excess of isocyanate over hydroxyl groups is used. Generally, formulations with an isocyanate index (the ratio of isocyanate groups to hydroxyl groups) of 1.5 or more along with certain catalysts, form foams with isocyanurate groups along with urethane groups. These foams will be referred to as polyisocyanurate foams. Isocyanurate groups result in a more cross-linked foam since they are formed from the reaction of three isocyanate groups.

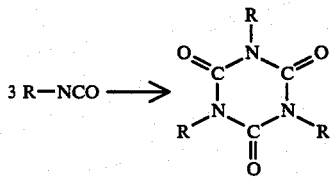

Typical blowing agents are the various chlorofluorocarbons (CFC). Throughout this specification the following symbols are used with respect to blowing agents: CFC-11 (or I-11) refers to $CCl_3F$, CFC-113 (or I-113) refers to $CCl_2FCClF_2$, CFC-12 (or I-12) refers to $CCl_2F_2$, CFC-142b (or I-142b) refers to $CH_3CClF_2$, CFC-114 (or I-114) refers to $CClF_2CClF_2$ and CFC-22 (or I-22) refers to $CHClF_2$.

The present invention permits usage of higher levels of aromatic polyesters polyols (hereinafter referred to as "APPs") in the polyol component. Such higher levels of aromatic polyester polyols have the advantages of lower costs with respect to the portion of the polyol component that it replaces, as well as providing a product of lower combustibility levels and a product that is less brittle. More detailed characteristics of these polyols are discussed in the literature (See, e.g., *Proceedings of the SPI-28th Annual Technical/Marketing Conference*, Technomic Publ. Co., Lancaster Pa., 1984, pp. 40–65).

Applicant's invention includes substitution of CFC-22 for at least a portion of the conventionally used CFC-12 and/or CFC-11 blowing agent which enables the proportion of the aromatic polyester polyol in the polyol component to be increased.

Heretofore the fraction of the aromatic polyester polyol in the polyol component has been undesirably limited because of the inadequate solubility of the required frothing and blowing agents in the polyol component. The solubility limitation is particularly acute with CFC-12, which is the most frequently used blowing agent for pre-expanding the polyol/isocyanate formulation before the exotherm from the reaction of the two components expands the primary blowing agent, typically CFC-11. In formulations wherein CFC-12 must be dissolved along with CFC-11 under pressure in the polyol component of the formulation, the level of aromatic polyester polyol which can be used is very limited because of the solubility limitation, manifested typically by separation of the liquid phase.

Most rigid polyurethane foams incorporated other types of polyols ("copolyols") in addition to the aromatic polyester polyol in the formulation to achieve adequate physical properties such as improved dimensional stability during aging tests at high humidity. Usually these copolyols have higher functionality for higher degrees of cross-linking and exhibit improved compatibility with CFC-11, but the copolyols are far more expensive than the aromatic polyester polyols and contribute less to fire retardancy. Use of a larger amount of aromatic polyester polyol as allowed by practice of the invention, which replaces the higher cost polyols (typically propoxylated/ethoxylated sucrose derivatives) lowers overall foam costs while providing a product that is less brittle.

SUMMARY OF THE INVENTION

Throughout this specification and claims it is to be understood that polyurethane includes polyurethanes that contain polyisocyanurates (formed by the cross-linking reaction of three isocyanate groups to provide trimers).

The process of the invention is defined as a process for the manufacture of a polyurethane foam which comprises (a) forming within a mixing zone a reaction mixture containing:
(i) an organic isocyanate,
(ii) an organic polyol that includes an aromatic polyester polyol, and
(iii) an inert blowing agent comprising (1) from 0.7 to 14 weight percent of the reaction mixture of $CHClF_2$ and (2) from zero weight percent of the reaction mixture up to the solubility limit in the reaction mixture of a second blowing agent selected from the group comprising $CCl_3F$, $CCl_2F_2$, $C_2Cl_3F_3$, $CH_3CClF_2$, $C_2Cl_2F_4$ or mixtures thereof;

(b) discharging the mixture from the mixing zone to provide: (1) expansion of the inert blowing agent, (2) reaction of the isocyanate and the polyol in an exothermic reaction, and (3) further expansion of the inert blowing agent by heat from the exothermic reaction to form a foamed reaction product; and
(c) allowing the foamed reaction product to cure to provide the polyurethane foam.

It is preferred that the inert blowing agent of (a)(iii) and the organic polyol of (a)(ii) and premixed to provide a polyol and blowing agent mixture, and that in (a) the mixing zone is maintained at elevated pressure to maintain the blowing agent in a liquid form and in (b) the reaction mixture is discharged from the mixing zone to a zone of lower pressure to promote expansion of the inert blowing agent to provide a froth-like foam of the reaction mixture followed by reaction of the isocyanate and the polyol in an exothermic reaction and additional expansion of the inert blowing agent by heat from the exothermic reaction to provide a foamed reaction product.

The invention includes the above process wherein an inert blowing agent selected from the group comprising $CCl_3F$, $CCl_2F_2$, $C_2H_3ClF_2$, $C_2Cl_2F_4$, $C_2Cl_3F_3$, and $CHClF_2$, or mixtures thereof is premixed with the organic isocyanate and the reaction mixture includes a surfactant and a catalyst to promote the reaction of the isocyanate and the polyol.

The polyurethane and/or poly(urethane/isocyanurate) foam of the process has a density within the range of 1 to 20 pounds per cubic foot, preferably 1.5 to 10 pounds per cubic foot and preferably 1.5 to about 3.0 pounds per cubic foot for insulation purposes.

Preferably, the total blowing agent present is within the range of 1.5 to 28 weight percent of the reaction mixture and the amount of $CHClF_2$ blowing agent premixed with the organic polyol is within the range of about 0.7 to 14 weight percent of the reaction mixture. It is preferred that the organic polyol comprises an aromatic polyester polyol in an amount of at least 3 weight percent of the reaction mixture up to the maximum solubility of the aromatic polyester polyol in the polyol and blowing agent mixture.

The reaction mixture has an isocyanate index within the range of 1.0 to 5.

It is preferred that the organic isocyanate comprises from 39 to 85 weight percent of the reaction mixture, the organic polyol comprises from 9 to 52 weight percent of the reaction mixture, and the inert blowing agent comprises from 1.5 to 28 weight percent of the reaction mixture.

The reaction mixture can include up to 1.0 weight percent water to form carbon dioxide that acts as additional blowing agent and an amine that reacts with a portion of the isocyanate to provide urea groups and a modified foam structure.

DETAILED DESCRIPTION OF THE INVENTION

The aromatic polyester polyols useful in the practice of this invention are commercially available from a number of sources. These APPs are generally obtained by transesterification of aromatic esters (e.g., from by-products of dimethyl terephthalate manufacture or polyethylene terephthalate scraps) with diethylene glycol and have a low functionality, typically an average of 2.3 hydroxy groups per molecule.

The discussion that follows as well as the data presented in Tables I–IX offer guidance to the artisan in selecting the optimum levels of reactants and blowing agent components over a wide range of varying conditions, depending upon the precise properties desired in the final polyurethane/polyisocyanurate foam.

The solubility parameter of a compound is a characterization of the solubility of a solute. (See H. Burrell, B. Immergut in "Polymer Handbook", J. Brandrup, E. Immergut editors, Interscience division of John Wiley and Sons, N.Y., 1966, p, IV 341). CFC-22 has a solubility parameter of 6.5, intermediate between that of CFC-12 (6.1) (as well as CFC-142b and CFC-114) and CFC-11 (7.5), and would therefore be expected to dissolve in APPs to an intermediate extent. However, surprisingly it has been found that the solubility of CFC-22 in APPs is actually greater than the solubility of CFC-11 in APPs.

Table I (below) illustrates solubility and vapor pressure of various blowing agents in different polyols and an aromatic polyester polyol ("Terate ®-203", sold by Hercules, Inc., hereinafter called T-203). The other three polyols in Table I are conventional polyols.

The results in Table I show that, in general, compounds with a higher solubility parameter dissolve to a greater extent in T-203. Surprisingly, CFC-22 has excellent solubility in APPs, notwithstanding its relatively low solubility parameter. CFC-22 is soluble up through the limit studied (100 parts CFC-22 per 100 parts polyol, expressed as "php").

An additional benefit from the use of CFC-22 and APP, as shown in the Table I results, is that the vapor pressure is lower than that of an equivalent molar amount of CFC-12 in APP. It is believed that this reduction in vapor pressure results from the excellent solubility of CFC-22 under these conditions which permits the use of containers having a lower pressure design, thus resulting in lower costs and easier handling.

The results of Table I also show that the typical copolyols (Multranol ®4034 and 4030 from Mobay Chemical Co., and 71–530 from Olin) exhibit excellent solubility with CFC-11 and CFC-22 while the solubility of CFC-12 remains low. CFC-113, sometimes used conventionally in place of CFC-11, also has a limited solubility in the polyols in Table I.

TABLE I

| | | Blowing Agent Solubility and Pressure in Polyols | | | | | | |
|---|---|---|---|---|---|---|---|---|
| | | Polyols | | | | Mmoles of[3] | Vapor Pressure | |
| Blowing Agent | Solubility Parameter | Terate ®[4] T203 | Multranol ®[5] 4034 | Multranol ®[5] 4030 | Poly-G[6] 71530 | Blowing Agent in 10 g. T203 | of Pure Blowing Agent 70° F. (psia) | Vapor Pressure[3] in T203 (psia/mmole) |
| | | Blowing Agent Solubility (php[2]) | | | | | | |
| 142b | 6.0 | 10.3 | 62.6 | 100 | 75.8 | 2.8 | 43.8 | 9.0 |
| 12 | 6.1 | 9 | 16.6 | 35.6 | 29.2 | 4.1 | 84.9 | 10.2 |
| 114 | 6.2 | 5.7 | 7.9 | 9.1 | 8.6 | 1.8 | 27.6 | 11.3 |
| 22 | 6.5 | ≧100 | ≧100 | ≧100 | ≧100 | 6.9 | 136.1 | 3.2 |
| 113 | 7.2 | 15.4 | 12.8 | 28.8 | 23.0 | — | <14.7 | <14.7 |
| 11 | 7.5 | 15.4 | ≧100 | ≧100 | ≧100 | — | <14.7 | <14.7 |

TABLE I-continued

| Blowing Agent | Solubility Parameter | Blowing Agent Solubility and Pressure in Polyols | | | | Mmoles of[3] Blowing Agent in 10 g. T203 | Vapor Pressure of Pure Blowing Agent 70° F. (psia) | Vapor Pressure[3] in T203 (psia/mmole) |
|---|---|---|---|---|---|---|---|---|
| | | Polyols | | | | | | |
| | | Terate ® [4] T203 | Multranol ® [5] 4034 | Multranol ® [5] 4030 | Poly-G [6] 71530 | | | |
| | | Blowing Agent Solubility (php[2]) | | | | | | |
| DME[1] | 8.8 | 56 | ≧100 | ≧100 | ≧100 | 20.2 | 77.7 | 1.8 |
| $CH_2Cl_2$ | 9.7 | ≧100 | ≧100 | ≧100 | ≧100 | — | <14.7 | <14.7 |
| Methyl Formate | 10.2 | ≧100 | ≧100 | ≧100 | ≧100 | — | <14.7 | <14.7 |

Footnotes:
[1] Dimethyl ethylene = DME
[2] php = parts (by weight) per hundred polyol
[3] The indicated amount of blowing agent was dissolved in 10 g. aliquots of T-203 in pressure bottles. The resulting pressure at 70° F. was measured and divided by the number of millimoles (mmoles) of blowing agent present.
[4] Product of Hercules, Inc.
[5] Product of Mobay Chemical Co.
[6] Product of Olin Chemicals Table II (below) illustrates the compatibility of various combinations of blowing agents over a range of ratios of APPs and conventional polyols, as typically formulated with surfactant, catalyst and water to make up one of the two parts (isocyanate being the other part) for a polyurethane foam formulation. All numbers, unless otherwise indicated, in the Tables refer to parts by weight in the total weight of the composition. Table II shows that, in contrast to CFC-12, CFC-22 is soluble in a polyol component of a urethane formulation that contains CFC-11 over a range of from about 25% to 50% APP in the polyol component. CFC-22 is also soluble in the isocyanate component of the formulation, promoting good mixing of the two components.

TABLE II

| Component | Source | Type | Blowing Agent Compatability at 37° F. | | | | | | | | | |
|---|---|---|---|---|---|---|---|---|---|---|---|---|
| | | | 1 | 2 | 3 | 4 | 5 | 6 | 7 | 8 | 9 | 10 |
| Terate ® 203 | Hercules Inc. | Polyol | 25 | 25 | 34 | 34 | 42 | 42 | 50 | 50 | | |
| 71-530 | Olin Chemicals | Polyol | 75 | 75 | 66 | 66 | 58 | 58 | 50 | 50 | | |
| Polycat ® 8 | Abbott Laboratories | Catalyst | 1 | 1 | 1 | 1 | 1 | 1 | 1 | 1 | | |
| Water | dionizer | | 1 | 1 | 1 | 1 | 1 | 1 | 1 | 1 | | |
| DC 193 | Dow Corning Corp. | Surfactant | 2 | 2 | 2 | 2 | 2 | 2 | 2 | 2 | | |
| I-11 SBA | Pennwalt Corp. | Blowing Agent | 29.0 | 29.0 | 28.2 | 28.2 | 27.5 | 27.5 | 26.7 | 26.7 | | |
| I-12[3] | Pennwalt Corp. | Frothing Agent | 14 | | 14 | | 14 | | 14 | | 12 | |
| I-22[3] | Pennwalt Corp. | Frothing Agent | | 12 | | 12 | | 12 | | 12 | | 10.5 |
| Mondur ® MR | Mobay Chemical Co. | Isocyanate | | | | | | | | | 100 | 100 |
| Miscibility[1] | 3 days at room temperature | | I | M | I | M | I | M | I | M | M[2] | M[2] |
| | 14 days at 37° F. | | I | M | I | M | I | M | I | M | M[2] | M[2] |
| | 30 days at 37° F. | | I | M | I | M | I | M | I | M | M[2] | M[2] |

Footnotes:
[1] I — immiscible, M = miscible
[2] Small amount of solid formed, possibly due to trace moisture reacting with isocyanate.
[3] Ideal gas law calculations show that 12.5 parts of 12 and 10.1 parts of 22 were actually in solution (as opposed to being gas).

Table III (below) reflects the stability results of CFC-11, 12 and 22 in the polyol component of a typical urethane formulation. The measured response is acidity which is a reflection of the stability of the product. The results do show some increase in acidity in going from the 25% to 50% level of APP in the polyol component. As expected, acidity also increases with length of the aging period.

TABLE III

Stability of I-11, 12, and 22 in Urethane Polyol Side:
Results of $2^4$ Experimental Design

| Function | Component | Levels |
|---|---|---|

TABLE III-continued

Stability of I-11, 12, and 22 in Urethane Polyol Side:
Results of $2^4$ Experimental Design

| Polyol | Terate 203:71-530 | 25:75 | 50:50 |
|---|---|---|---|
| React with RNCO | Water | 1.0 | |
| Frothing Agent | I-22 or I-12 | 6.5(I-22) | 9.2(I-12) |
| Surfactant | Dow Corning 193 | 2.0 | |
| Catalyst | Polycat 8 | 1.0 | |
| Blowing Agent | I-11SBA (0.5% inhibitor) | 0 | 26 |
| # Days Aged at 100° F. | | 18 | 49 |
| Yates Analysis: | Response (As measured) Mean: | Acidity .0395 meq H+/g. | |
| | Significant variables:[1] | ½ effect | |
| | Time | .007 | |
| | 203:71-530 Ratio | .010 | |

[1] Tested at 95% confidence level

Table IV (below) contains the data for the stability study for Examples 1-16, the results of the experimental design having been summarized in Table III.

TABLE IV

Results of the Experimental Design Summarized in Table III

| Example No. | Frothing Agent | Ratio of T203:71-530 | Level of I-11SBA | Days at 100° F. | Acidity (meq. H+/g.) |
|---|---|---|---|---|---|
| 1 | 6.9 I-22 | .33 | 0 | 18 | .028 |
| 2 | 9.2 I-12 | .33 | 0 | 18 | .022 |
| 3 | 6.9 I-22 | 1.0 | 0 | 18 | .043 |

TABLE IV-continued

Results of the Experimental Design Summarized in Table III

| Example No. | Frothing Agent | Ratio of T203:71-530 | Level of I-11SBA | Days at 100° F. | Acidity (meq. H+/g.) |
|---|---|---|---|---|---|
| 4 | 9.2 I-12 | 1.0 | 0 | 18 | .045 |
| 5 | 6.9 I-22 | .33 | 26 | 18 | .022 |
| 6 | 9.2 I-12 | .33 | 26 | 18 | |
| 7 | 6.9 I-22 | 1.0 | 26 | 18 | .040 |
| 8 | 9.2 I-12 | 1.0 | 26 | 18 | .039 |
| 9 | 6.9 I-22 | .33 | 0 | 49 | .048 |
| 10 | 9.2 I-12 | .33 | 0 | 49 | .029 |
| 11 | 6.9 I-22 | 1.0 | 0 | 49 | .053 |
| 12 | 9.2 I-12 | 1.0 | 0 | 49 | .061 |
| 13 | 6.9 I-22 | .33 | 26 | 49 | .037 |
| 14 | 9.2 I-12 | .33 | 26 | 49 | .028 |
| 15 | 6.9 I-22 | 1.0 | 26 | 49 | .060 |
| 16 | 9.2 I-12 | 1.0 | 26 | 49 | .057 |

Table V (below) shows that acidity also increases with time in samples aged without any blowing agent present. This suggests that the acidity increase with time is due to hydrolysis of the APP, which would provide an aromatic carboxylic acid.

Chemical stability of the blowing agent is important in a pre-formulated two part urethane which needs a significant shelf life. Decomposition of blowing agent would provide acid which would neutralize the amine catalyst in the polyol component, thereby reducing foam reactivity. As discussed earlier, the results in Tables III and IV, based upon a Yates analysis of the experimental design, show that there is no significant difference in acidity in changing from CFC-12 to CFC-22. Acidity was higher at high APP levels, in large measure because the APP is slightly acidic initially. Also, acidity increased with longer aging times primarily due to hydrolysis of the APP.

TABLE V

Stability of Polyol Mixtures Without Blowing Agent

| Sample | T203:71-530 | Calculated Acidity[1] | Acidity After 33 Days at Room Temperature | Acidity After 29 Days at Room Temperature + 21 Days at 100° |
|---|---|---|---|---|
| 5854-59 G[2] | 25:75 | .017 meq. H+/g. | .020 meq. H+/g. | .024 meq. H+/g. |
| -59 K[2] | 50:50 | .034 | .038 | .049 |

Footnotes:
[1] Based on reported acidity of the batch of Terate 203 used.

[2]
|  | 59 | 59 |
|---|---|---|
| T203 | 25 | 50 |
| 71-530 | 75 | 50 |
| Polycat 8 | 1 | 1 |
| DC 193 | 2 | 2 |
| Water | 1 | 1 |

EXAMPLE 17

A typical formulation for the preparation of rigid urethane foam (isocyanate index of 1.1) is illustrated in Table VI below. The APP (Terate T-203) and the branched, sucrose-based, amine containing polyether by Olin Corporation ("71-530") are added to a suitable pressure vessel and stirred until substantially homogeneous. The branching in the 71-530 polyol leads to cross-linking and rigidity in the final product. Polycat 8 (a tertiary amine catalyst supplied by Abbott), water, Dow Corning 193 (a silicone glycol surfactant), and CFC-11 (ISOTRON®11 SBA, CFC-11, sold by Pennwalt Corporation, having 0.25% alpha methyl styrene to inhibit reaction of CFC-11 with the polyol) and CFC-22 are sequentially stirred into the mixture to provide a homogeneous solution.

The catalyst increases the rate of urethane formation while the surfactant stabilizes the growing foam cells against collapse. Water reacts with the isocyanate to give $CO_2$ (an auxillary blowing agent) and an amine which goes on to react with an isocyanate to form a urea linkage.

This mixture is supplied under pressure to the nozzle of a conventional foam machine. Simultaneously, the isocyanate stream containing CFC-22 and Mondur®MR (a polymethylene polyphenylisocyanate supplied by Mobay Chemical Co.) is pumped into the nozzle in the ratio specified in the table. CFC-22 is added to this stream to reduce the stream's viscosity and thus promote better mixing with the polyol stream. The two streams are mixed within the nozzle of the foam machine and dispensed as a foaming liquid froth which rises and hardens to yield a rigid foam of under 2 pcf free rise density.

Some CFC-12 can be substituted for the CFC-22 and still maintain a homogeneous solution. For example, the typical polyol formulation of Table VII can tolerate substitution of 40% of the I-22 with I-12, while 60% substitution causes phase separation. Such substitution can provide a cost advantage as I-12 is less expensive than I-22, provided that sufficient APP is present to provide the ultimate desired properties of the final foam.

It should also be noted that 26.5 pbw of I-11SBA have borderline solubility in this formulation but that addition of I-22 gives a homogeneous solution. This ability of I-22 to allow the dissolution of higher levesl of I-11SBA is particularly important in foams with higher isocyanate index (e.g., Example 18, which requires a higher fraction of blowing agent in the polyol component).

TABLE VI

Urethane and Urethane-Isocyanurate Formulations

| (parts by weight) | | |
|---|---|---|
| | Urethane | Urethane-Isocyanurate |
| Polyol Component | | |
| Terate 203 | 50 | 50 |
| 71-530 | 50 | 50 |
| Water | 1 | — |
| DMP30 | — | 0.7 |
| Polycat 8 | 1 | 1 |
| T45 | — | 2.0 |
| DC 193 | 2 | 2 |
| ISOTRON 11 | 26.7 | 45.1 |
| ISOTRON 22 | 6 | 9.3 |
| Isocyanate Component | | |
| Mondur MR | 124.5 | 196.8 |
| ISOTRON 22 | 6 | 9.3 |
| Isocyanate Index[1] | 1.1 | 2.0 |

TABLE VI-continued

Urethane and Urethane-Isocyanurate Formulations (parts by weight)

|  | Urethane | Urethane-Isocyanurate |
|---|---|---|
| Hydroxyl Equivalents | .851 | .740 |

[1] Isocyanate Index = Number equivalents of isocyanate/number equivalents of hydroxyl group.

TABLE VII

Solubility of Blends of I-22 and I-12 in the Polyol Side

|  | A (pbw) | B (pbw) | C (pbw) | D (pbw) |
|---|---|---|---|---|
| Polyol Side: |  |  |  |  |
| 50 pbw[1] Terate 203 | 100 | 100 | 100 | 100 |
| 50 pbw[1] 71-530 |  |  |  |  |
| 1 pbw[1] Polycat 8 |  |  |  |  |
| 1 pbw[1] water |  |  |  |  |
| 2 pbw[1] DC-193 |  |  |  |  |
| ISOTRON 11SBA | 26.5 | 26.5 | 26.5 | 26.5 |
| 80/20 I-22/I-12 Blend | 13 | — | — | — |
| 60/40 I-22/I-12 Blend | — | 13 | — | — |
| 40/60 I-22/I-12 Blend | — | — | 13 | — |
| After 1 Month at 37° F. | clear, soluble | clear, soluble | 2 phase | cloudy - borderline soluble |

[1] pbw = parts by weight

EXAMPLE 18

This example illustrates the typical preparation of a rigid urethane-isocyanurate foam (isocyanate index=2.0).

The formulation is as set forth in Table VI above and the processing conditions are similar to that in the preceding Example 17. DMP30 is a catalyst (2,4,6-tri(dimethylamino)-methylphenol) supplied by Rohm and Haas Company. The higher ratio of isocyanate to hydroxyl groups (as measured by the isocyanate index) as well as T45 catalyst (M and T Chemicals) in this foam allows formation of isocyanate trimers (isocyanurates) which increases the degree of cross-linking. Such increase in cross-linking increases the fire resistance of the final foam, but also the friability of the foam is undesirably increased. The presence of the aromatic polyester polyol is formed to counteract this effect of brittleness increase to some extent. This is presumed to occur because the APP typically has a 2.3 functionality (number of hydroxyl groups/molecule) which is lower than the conventional polyol (e.g., the functionality of 71-530 is about 5), which would be expected to lower the overall level of cross-linking in the final foam product.

The Examples in this specification clearly demonstrate the suitability of CFC-22 as a blowing agent from the standpoint of solubility, stability, and pressure of the polyol mixture. The Examples also illustrate typical formulations of polyurethane and polyurethane/isocyanurate foams.

I claim:

1. A process for the manufacture of a polyurethane foam which comprises
   (a) forming within a mixing zone a reaction mixture containing:
      (i) an organic isocyanate,
      (ii) an organic polyol that includes an aromatic polyester polyol in an amount of at least 1.0 percent by weight of the reaction mixture, and
      (iii) an inert blowing agent comprising (1) from 0.7 to 14 weight percent of the reaction mixture of $CHClF_2$ and (2) from 0.8 weight percent of the reaction mixture up to the solubility limit in the reaction mixture of a second blowing agent selected from the group comprising $CCl_3F$, $CCl_2F_2$, $C_2Cl_3F_3$, $CH_3CClF_2$, $C_2Cl_2F_4$ or mixtures thereof;
   (b) discharging the mixture from the mixing zone to provide: (1) expansion of the inert blowing agent, (2) reaction of the isocyanate and the polyol in an exothermic reaction, and (3) further expansion of the inert blowing agent by heat from the exothermic reaction to form a foamed reaction product; and
   (c) allowing the foamed reaction product to cure to provide the polyurethane foam.

2. The process as in claim 1 wherein the inert blowing agent of (a)(iii) and the organic polyol of (a)(ii) are premixed to provide a polyol and blowing agent mixture.

3. The process as in claim 2 wherein in (a) the mixing zone is maintained at elevated pressure to maintain the blowing agent in a liquid form and in (b) the reaction mixture is discharged from the mixing zone to a zone of lower pressure to promote expansion of the inert blowing agent to provide a froth-like foam of the reaction mixture followed by reaction of the isocyanate and the polyol in an exothermic reaction and additional expansion of the inert blowing agent by heat from the exothermic reaction to provide a foamed reaction product.

4. The process as in claim 2 wherein an inert blowing agent selected from the group comprising $CCl_3F$, $CCl_2F_2$, $C_2H_3ClF_2$, $C_2Cl_2F_4$, $C_2Cl_3F_3$, and $CHClF_2$, or mixtures thereof is premixed with the organic isocyanate.

5. The process as in claim 2 wherein the reaction mixture includes a surfactant and a catalyst to promote the reaction of the isocyanate and the polyol.

6. The process as in claim 2 wherein the polyurethane foam has a density of 1 to 20 pounds per cubic foot.

7. The process as in claim 2 wherein the polyurethane foam has a density of 1.5 to 3.0 pounds per cubic foot.

8. The process as in claim 2 wherein the amount of blowing agent present is within the range of 1.5 to 28 weight percent of the reaction mixture.

9. The process as in claim 2 wherein the amount of $CHClF_2$ blowing agent present in within the range of 0.7 to 14 weight percent of the reaction mixture.

10. The process as in claim 2 wherein the amount of $CHClF_2$ blowing agent present is within the range of 0.7 to 6 weight percent of the reaction mixture.

11. The process as in claim 2 wherein the organic polyol comprises an aromatic polyester polyol in an amount of at least 3 weight percent of the reaction mixture up to the maximum solubility of the aromatic polyester polyol in the polyol and blowing agent mixture.

12. The process as in claim 1 wherein the reaction mixture has an isocyanate index within the range of 1.0 to 5.

13. The process as in claim 2 wherein the reaction mixture has an isocyanate index within the range of 1.5 to 5 to provide a poly(urethane/isocyanurate) foam.

14. The process as in claims 1, 2, 3, 4, 5, 6, 7, 8, 9, 10, 11, 12 or 13 wherein the organic isocyanate comprises from 39 to 85 weight percent of the reaction mixture, the organic polyol comprises from 9 to 52 weight percent of the reaction mixture, and the inert blowing agent comprises from 1.5 to 28 weight percent of the reaction mixture.

15. The process as in claim 14 wherein the reaction mixture includes up to 1.0 weight percent water to form carbon dioxide that acts as additional blowing agent and an amine that reacts with a portion of the isocyanate to provide area groups and a modified foam structure.

* * * * *